United States Patent [19]

Glance

[11] Patent Number: 5,488,500
[45] Date of Patent: Jan. 30, 1996

[54] TUNABLE ADD DROP OPTICAL FILTERING METHOD AND APPARATUS

[75] Inventor: Bernard Glance, Colts Neck, N.J.

[73] Assignee: AT&T Corp., Murray Hill, N.J.

[21] Appl. No.: 298,820

[22] Filed: Aug. 31, 1994

[51] Int. Cl.$^6$ ............................................. H04J 14/02
[52] U.S. Cl. ..................... 359/127; 359/128; 359/130; 385/24
[58] Field of Search ........................ 359/117, 123, 359/124, 127, 128, 130, 125; 385/24

[56] References Cited

U.S. PATENT DOCUMENTS

| | | | |
|---|---|---|---|
| 5,136,671 | 8/1992 | Dragone | 385/46 |
| 5,367,586 | 11/1994 | Glance | 359/114 |

FOREIGN PATENT DOCUMENTS

| | | | |
|---|---|---|---|
| 0293833 | 12/1987 | Japan | 359/130 |
| 2202404 | 9/1989 | United Kingdom | 359/130 |

OTHER PUBLICATIONS

Dragone, C., "An N×N Optical Multiplexer Using a Planar Arrangement of Two Star Couplers," IEEE Photonics Technology Letters, vol. 3, No. 9, Sep. 1991, pp. 812–815.

Dragone, C., et al., "Integrated Optics N×N Multiplexer on Silicon," IEEE Photonics Technology Letters, vol. 3, No. 10, Oct. 1991, pp. 896–899.

Cheung, K. –W., "Acoustooptic Tunable Filters in Narrowband WDM Networks: System Issues and Network Applications," Journal on Selected Areas in Communications, vol. 8, No. 6, Aug. 1990, pp. 1015–1025.

Elrefaie, A. F., "Multiwavelength Survivable Ring Network Architectures," GLOBECOM '89 Proc., Dallas, Tex., Nov. 1989.

*Primary Examiner*—Leslie Pascal

[57] ABSTRACT

The present invention includes a tunable add/drop filter that utilizes the unique operational characteristics of a wavelength grating router. The filter comprises a 1×N switch, a wavelength grating router (WGR) having a plurality of inputs and outputs, and a multiplexer. The WGR demultiplexes an incoming wavelength division multiplexed (WDM) signal, providing the frequency components of the WDM signal at different outputs. The WGR outputs include a set of retain outputs that are coupled directly to the multiplexer and a drop output that is connected to a drop line. The particular WDM signal frequency component that is provided to the drop output depends directly on the WGR input at which the WDM signal is received. The 1×N switch controllably provides the WDM signal to the proper WGR input so that a select frequency is provided at the drop output, which in turn drops the select frequency from the WDM signal. The undropped signals, as well as any added signals are multiplexed into a new WDM signal by the multiplexer.

20 Claims, 5 Drawing Sheets

5,488,500

TUNABLE ADD DROP OPTICAL FILTERING METHOD AND APPARATUS

FIELD OF THE INVENTION

The present invention relates generally to optical communication systems, and more particularly to add/drop optical filters for use in optical communication systems.

BACKGROUND OF THE INVENTION

Information communication efficiency over an optical fiber transmission system may be increased by optical wavelength division multiplexing. Wavelength division multiplexed (WDM) systems employ WDM signals consisting of a number of different wavelength optical signals, known as carrier signals or channels, to transmit information on optical fiber. Each carrier signal is modulated by one or more information signals. As a result, a significant number of information signals may be transmitted over a single optical fiber using WDM signals.

To facilitate the addition and subtraction of particular carrier signals to or from the WDM signal at different locations on the network, optical add/drop filters are employed. It should be noted that channels within a WDM signal may be distinguished by either their optical wavelength or optical frequency, and the terms frequency and wavelength will be interchangeably referred to for this purpose.

One known type of network employing such filters is the optical ring network. In a ring network, a ring of one or more transmission fibers facilitates communication between several network nodes. In such networks, a node may originate an information signal which is then modulated onto a carrier signal having a certain optical wavelength. The modulated optical signal is subsequently added to the WDM signal for transmission on the ring network to the appropriate destination node or nodes. At the section of the WDM ring located near the destination node, a filter removes or drops the appropriate channel from the WDM signal. The dropped channel or optical signal is then transmitted to the destination node, where the information signal may be demodulated and used.

For further explanation of the details and operations of such networks, see, for example, A. F. Elrefaie, "Multiwavelength Survivable Ring Network Architectures," GLOBECOM '89 Proc., Dallas, Tex. (Nov. 1989), and A. F. Elrefaie, et al., "Fiber-Amplifier Cascades with Gain Equalization in Multiwavelength Unidirectional Inter-Office Ring Networks," IEEE Photonics Tech. Letters, Vol. 5, No. 9, pp. 1026–28 (September 1993), both of which are incorporated by reference herein. Optical filters capable of dropping and adding signals at specific wavelengths into an optical fiber are essential components in any network utilizing WDM signals including such ring networks.

At present, add/drop filters ordinarily consist of a 1×N demultiplexer followed by an N×1 multiplexer. The first element demultiplexes the frequency components of the input WDM signal, providing the frequency components to its N output ports. A desired frequency component is then dropped by connecting the corresponding output port to a drop line fiber that is further connected to a destination node. The filter's N×1 multiplexer remultiplexes the remaining N−1 frequency components or channels, providing the WDM signal to the multiplexer output port. A signal of the same frequency as that of the dropped component may be added to the WDM signal using the unused port of the multiplexer.

One drawback of such filters is that the channel that is added and/or dropped is fixed by the physical configuration of the filter. Once an output port of the N×1 demultiplexer has been coupled to the drop line fiber, only that coupled channel may be dropped. Such inflexibility is undesirable.

Another prior art filter attempts to overcome this inflexibility by providing an acoustooptic tunable add/drop optical filter. K.-W. Cheung, "Acoustooptic Tunable Filters in Narrowband WDM Networks: System Issues and Network Applications," Journal on Selected Areas in Communications, Vol. 8, No. 6, pp. 1015–25 (August 1990). In this filter, the frequency component that is dropped may be controllably selected without physically reconfiguring the fiber connections.

The acoustooptic filter includes a waveguide substrate having an input port, a grating, an output port and a drop port. The filter also includes a source of acoustic waves which provides an acoustic wave to the grating of the substrate. The acoustic wave causes a particular optical frequency from an input WDM signal to propagate toward the drop port while the remaining optical frequencies propagate towards the output port. The optical frequency which is removed depends upon the frequency of the acoustic wave applied to the grating. Thus, control of the acoustic source allows the filter to be controllably tuned. Wavelength selective space-division optical networks employing this drop/add filter are proposed in the Cheung article, referred to above, at pp. 1022–25. However, it is noteworthy that such acoustooptic tunable filters have the added requirement of a finely-tuned source of acoustic waves.

SUMMARY OF THE INVENTION

The present invention includes a tunable add/drop filter that utilizes the unique operational characteristics of a wavelength grating router. The filter comprises a 1×N switch, a wavelength grating router (WGR) having a plurality of inputs and outputs, and a multiplexer. The WGR demultiplexes an incoming WDM signal, providing the frequency components of the WDM signal at different outputs. The configuration of the frequency components on the WGR outputs depends directly on the WGR input at which the WDM signal is received. One output of the WGR, called the drop output, is connected to a drop line. The 1×N switch controllably provides the WDM signal to the proper WGR input so that a select frequency is provided to the drop output, which in turn drops the select frequency from the WDM signal. The undropped signals, as well as any added signals, are multiplexed into a new WDM signal by the multiplexer.

In exemplary embodiments of the present invention, the multiplexer may comprise a star coupler, or a second WGR coupled to a second 1×N switch.

Other features and embodiments of the present invention will become clear to those of ordinary skill in the art by reference to the drawings and accompanying detailed description.

DETAILED DESCRIPTION OF THE DRAWINGS

Figure 1:
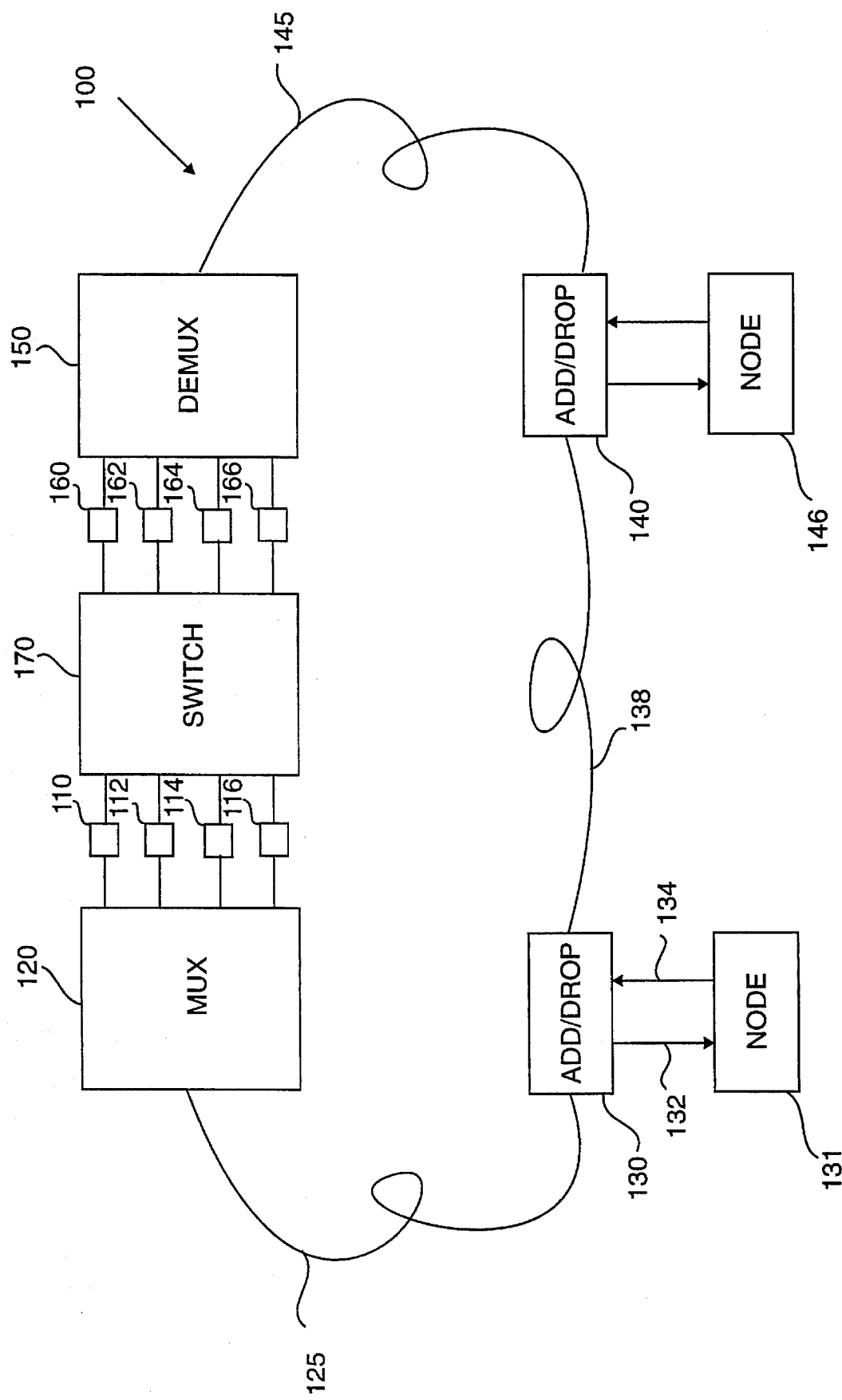
FIG. 1 illustrates a WDM optical ring network employing tunable add/drop filters operating according to the present invention.

FIG. 1 illustrates an exemplary WDM optical ring network 100 which may suitably be a part of a larger communication network, not shown. The network 100 includes a plurality of signal transmitters 110, 112, 114 and 116, a multiplexer 120, two add/drop filters 130 and 140, two network nodes 136 and 146, a demultiplexer 150, a plurality of signal receivers 160, 162, 164 and 166, and optical fibers 125, 138 and 145. The network 100 may suitably include other network nodes similar to the nodes 136 and 146.

The plurality of signal transmitters 110 through 116 are optically coupled to the multiplexer 120. The optical fiber 125 connects the multiplexer 120 to the first remotely located add/drop filter 130. The first add/drop filter 130 is a tunable add/drop filter according to the present invention, and may be, for example, either of the filters discussed below in connection with FIGS. 2 and 3. The first add/drop filter 130 is connected to the first network node 136 through a drop line 132 and an add line 134. The optical fiber 138 optically couples the first add/drop filter 130 to the second add/drop filter 140, which is also a tunable add/drop filter. The second add/drop filter is connected to the demultiplexer 150 through a length of optical fiber 145. The plurality of signal receivers 160 through 166 are optically coupled to the demultiplexer 150. Each of the receivers 160 through 166 is selectively coupled to one of the transmitters 110 through 116 via an optical switch 170.

In general, the ring network 100 effects communication between the nodes 136 and 146, as well as other nodes, not shown, through the use of information signals modulated onto optical carrier signals or frequency channels. Each node in the network transmits and receives information signals on a single frequency channel of a WDM signal. For example, the first network node 136 communicates on a frequency channel having a frequency $F_3$ while the second network node 146 communicates on a frequency channel having a frequency $F_1$.

In operation, electrical information signals I1, I2, I3 and I4 are provided to the signal sources 110, 112, 114 and 116, respectively. The signal transmitter 110 modulates I1 onto an optical carrier signal having a frequency $F_1$, the signal transmitter 112 modulates I2 onto an optical carrier signal having an optical frequency $F_2$, the signal transmitter 114 modulates I3 onto an optical carrier signal having an optical frequency $F_3$, and the signal transmitter 116 modulates I4 onto an optical carrier signal having an optical frequency $F_4$. It is assumed for the purposes of discussion that I3 consists of information signals destined for the first network node 136 while I1 consists of information signals destined for the second network node 146.

The multiplexer 120 receives the four optical carrier signals and multiplexes them into a single WDM optical signal W1 having four modulated frequency components or channels $\lambda_1$, $\lambda_2$, $\lambda_3$ and $\lambda_4$. The WDM signal W1 then propagates through the optical fiber 125 to the add/drop filter 130.

When the signal W1 reaches the first add/drop filter 130, a control signal either contained within W1 or provided externally directs the first add/drop filter 130 to remove the frequency component $\lambda_3$ from W1. The removed frequency component $\lambda_3$ propagates through the drop fiber 132 to the network node 136. At the network node 136 the information signal I3 is demodulated from the optical carrier signal and then stored, used or further transmitted. Another electrical information signal I3' is then modulated onto an optical signal $\lambda_3'$ having the same frequency as the dropped signal and propagated through the add fiber 134 to the add/drop filter 130. The information signal I3' contains the outgoing information from the network node 136.

The add/drop filter 130 then adds the modulated optical signal $\lambda_3'$ to the other channels, creating a WDM optical signal W1' comprising four modulated frequency components $\lambda_1$, $\lambda_2$, $\lambda_3'$ and $\lambda_4$. The signal W1' propagates through the fiber 138 to the second add/drop filter 140, where another control signal directs the second add/drop filter to remove a different frequency component, for example, $\lambda_1$, from W1', for similar purposes.

In particular, the dropped signal $\lambda_1$ is directed to the second network node by the add/drop filter 140 in a similar manner. The network node 146 then stores, uses or further transmits $I_1$. Another electrical information signal $I_1'$ is then modulated onto an optical signal $\lambda_1'$ having the same frequency as the dropped signal. The add/drop filter 140 multiplexes $\lambda_1'$, $\lambda_2$, $\lambda_3'$ and $\lambda_4$ into a WDM signal W1", which then propagates through the fiber 145 to the demultiplexer 150.

The demultiplexer 150 demultiplexes W1" into its frequency components $\lambda_1'$, $\lambda_2$, $\lambda_3'$ and $\lambda_4$ and provides them to the signal receivers 160 through 166, respectively. The receivers 160 through 166 demodulate $\lambda_1'$, $\lambda_2$, $\lambda_3'$ and $\lambda_4$ respectively and provide I1', I2, I3' and I4 to the switch 170. The switch 170 then directs each information signal to the transmitter corresponding to the frequency channel used by the node to which each information signal is destined. For example, if the network node 136 transmits $I_3'$ to the network node 146, the switch 170 directs $I_3'$ to the first transmitter 110, which modulates $I_3'$ onto the carrier frequency $F_1$.

Using the above described method, a central switching office formed by the multiplexer 120, the transmitters 110 through 116, the optical switch 170, the receivers 160 through 166 and the demultiplexer 150 can effect communication between the nodes 136 and 146, and other like nodes on the network 100, using WDM optical signals.

Under certain circumstances, it is desirable to change the frequency channel on which the network node 140 communicates. If, for example, the frequency $F_3$ becomes particularly lossy due to external factors, then the network node 140 may need to communicate on another available frequency. The filter 130 of the present invention may be controllably switched to provide a different frequency, for example, $F_4$, through application of the control signal discussed above. In contrast, prior art filters would ordinarily need to be physically reconfigured to provide a different frequency.

Figure 2A:
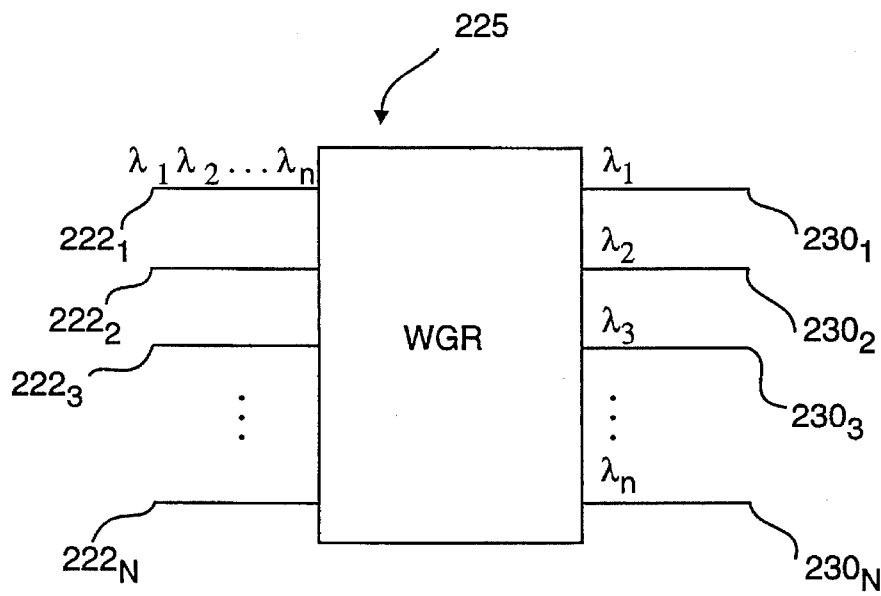
FIGS. 2A, 2B and 2C illustrate an overview of the input/output characteristics of the waveguide grating router.
Figure 2B:
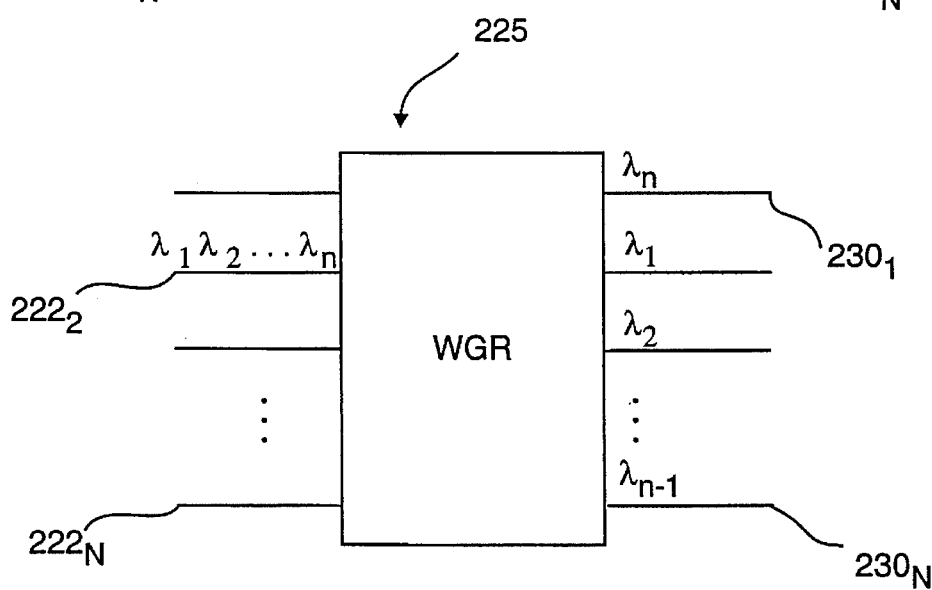
Figure 2C:
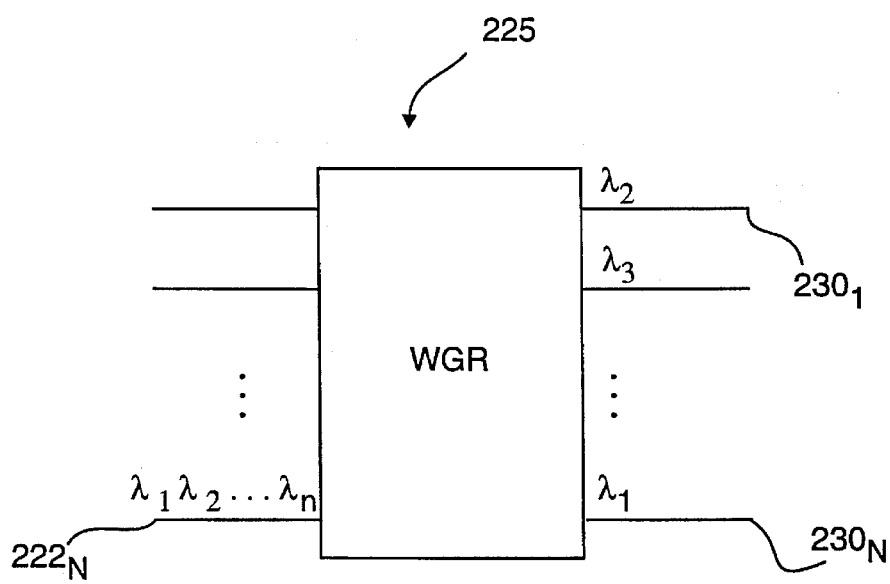
Figure 2:
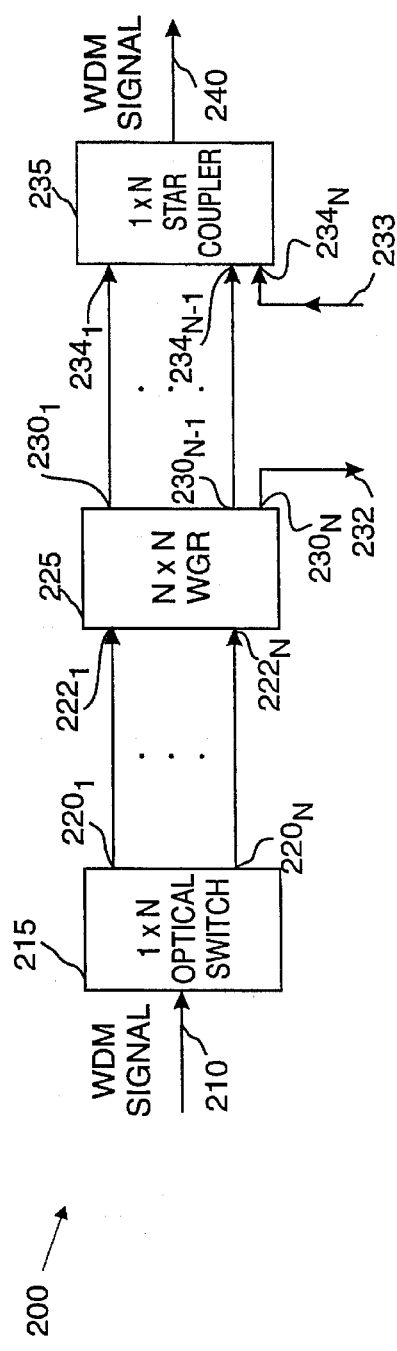
FIG. 2 illustrates an exemplary embodiment of an optical add/drop filter according to the present invention.

FIG. 2 illustrates a tunable optical add/drop filter 200 according to the present invention that may be implemented in the above system, as well as other WDM networks. The filter 200 exploits the distinctive input/output characteristics of the wavelength grating router, discussed below in connection with FIGS. 2A, 2B and 2C. The filter 200 may be utilized in a WDM optical network to remove at least one controllably selected frequency component from a WDM signal.

The filter 200 includes an input 210, a 1×N optical switch 215, an N×N waveguide grating router 225, a star coupler 235, and an output 240, connected in the following manner. The 1×N optical switch 215 has N outputs $220_1$ through $220_N$ and an input, which preferably is the filter input 210. The switch 215 may be any suitable optical switch such as a commercially available mechanical optical switch or an optoelectrical switch. The switch outputs $220_1$ through $220_N$ are coupled to the N inputs of the wavelength grating router (WGR) 225, such that the first switch output $220_1$ is connected to the first WGR input $222_1$, the second switch output is connected to the second WGR input $222_2$, and so forth. The WGR 224 also has N outputs $230_1$ through $230_N$.

Before continuing with a description of the filter 200, it is useful to address the operational characteristics of the WGR 225. The structure of a suitable WGR is discussed in further detail below in connection with FIG. 7, however, FIGS. 2A, 2B and 2C more generally illustrate the WGR input/output characteristics. In FIG. 2A, a WDM signal comprising frequency components $\lambda_1, \lambda_2, \ldots \lambda_N$ is provided at the first input $222_1$ of the WGR 225. In this case, the WGR 225 provides $\lambda_1$ at its first output 239, $\lambda_2$ at its second output $230_2$ and so forth, providing $\lambda_N$ at its Nth output $230_N$.

In FIG. 2B, the same WDM signal is provided to the second input $222_2$ of the WGR 225. The configuration of the frequency components shifts by one output. Thus, in this case, the WGR provides $\lambda_1$ at its second output $230_2$, $\lambda_2$ at its third output $230_3$, and so forth, providing $\lambda_{N-1}$ at its Nth output $230_N$. The output shift includes a wraparound, and therefore the frequency component $\lambda_N$ appears at the first WGR output $230_1$. For each subsequent WGR input, the configuration of frequency components on the WGR outputs shifts in a similar manner. Thus, for example, if the WDM signal is provided at the Nth input $222_N$, then the WGR 225 provides $\lambda_1$ at its Nth output $230_N$, $\lambda_2$ at its first output $230_1$, and $\lambda_3$ at its second output $230_2$, and so forth, as shown in FIG. 2C.

Returning to the description of the filter 200 shown in FIG. 2, the N outputs of the WGR 225 are divided into a set of N−1 retain outputs, $230_1$ through $230_{N-1}$, and a drop output $230_N$. The set of retain outputs $230_1$ through $230_{N-1}$ are each connected to one of N−1 inputs of the star coupler 235, such that the first WGR output $230_1$ is connected to the first star coupler input $234_1$, the second WGR output $230_2$ is connected to the second star coupler input $234_2$, and so forth. The star coupler 135 has a further input $234_N$, which is connected to an add line 233. The star coupler 235 may suitably comprise any commercially available star coupler, such as a Gould model 23-40355-14-04801 star coupler. The star coupler 235 also includes an output, which is connected to the filter output 240. The star coupler 235 may be replaced by other suitable multiplexing means, such as a combination of a second WGR and an optical switch, which are discussed below in connection with FIG. 3.

The drop output $230_N$ of the WGR 225 is connected to a drop line fiber 232. In another embodiment discussed below, more than one drop output may be provided in order to allow more than one channel to be dropped.

The filter 200 as described above operates generally in the following manner. A WDM signal including a plurality of frequency components propagates through a network, not shown, to the filter input 210. Thereafter, the 1×N optical switch 215 receives the WDM signal, and control signals contained within the received WDM signal or otherwise provided to the switch 215 direct the switch 215 to provide the WDM signal to a particular output, $220_x$. The output of the switch 215 at which the WDM signal is provided depends on the channel or frequency component of the signal intended to be dropped.

The signal thereafter propagates from the switch output $220_x$ to the WGR input $222_x$. The WGR 225 then provides at its N outputs $230_1$ through $230_N$ the frequency components of the WDM signal, such that each frequency component appears at a distinct WGR output. Thus, a quantity of N−1 frequency components appear at the set of WGR retain outputs $230_1$ through $230_{N-1}$ and one frequency component appears at the WGR drop output $230_N$. As discussed above, the particular WDM frequency component that appears at each WGR output depends directly upon the WGR input at which the WDM signal is received.

The select frequency component that is provided to the WGR drop output $230_N$ propagates down the drop line fiber 232. That select frequency component may then be provided to a destination such as the network node 136 from FIG. 1, above. The remaining frequency components that are provided to the set of retain outputs of the WGR 225 propagate from the WGR outputs $230_1$ through $230_{N-1}$ to the star coupler inputs $234_1$ through $234_{N-1}$.

As a result, the control signals determine the frequency to be dropped by instructing the optical switch 215 to provide the WDM signal to the input of the WGR 225 that produces a specific output configuration. Then, in that specific configuration, the select frequency component is provided to the drop output $230_N$ of the WGR 225. It is to be noted that the use of a presently available mechanical optical switch as the 1×N switch 215 allows controlled frequency tuning speeds of on the order of 0.01 seconds. In the alternative, the use of an optoelectronic switch as the switch 215 provides tuning speeds of on the order of nanoseconds.

In addition, an added signal, which comprises an information signal modulated onto a carrier signal having the same frequency as the dropped channel, is provided through an add line 233 to the input $234_N$ of the star coupler 235. The star coupler 235 then wavelength division multiplexes the remaining signals and the add signal and provides them to the filter output 240. The resulting WDM signal thus includes the original WDM signal with the select frequency component removed, plus the added signal.

Figure 3:
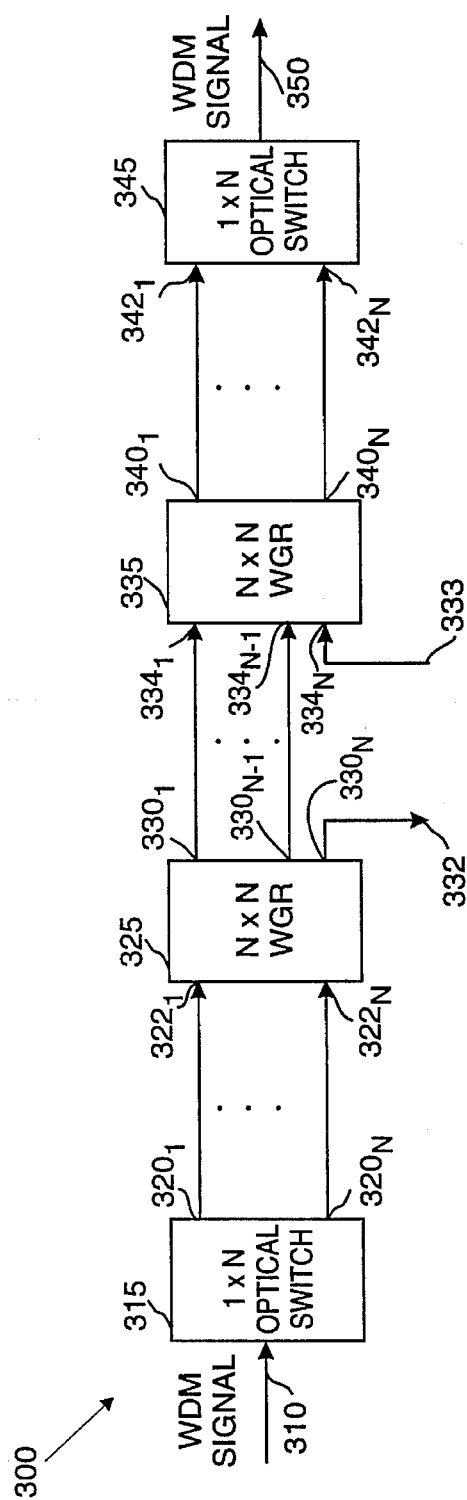
FIG. 3 illustrates an alternative embodiment of an optical add/drop filter according to the present invention.

FIG. 3 illustrates an alternative embodiment of a tunable optical add/drop filter 300 according to the present invention. The filter 300 comprises an input 310, first and second optical switches 315 and 345, first and second N×N WGRs 325 and 335, and an output 350. In this embodiment, the combination of the second WGR 335 and the second optical switch 345 replace the star coupler 235 from the filter 200 discussed above in connection with FIG. 2. At present, 1×N star couplers introduce 1/N attenuation to the optical network, which is more than the WGR and switch combined. As a result, the embodiment illustrated in FIG. 3 provides less attenuation than the embodiment of the filter in FIG. 2.

The first 1×N optical switch 315 has N outputs $320_1$ through $320_N$ connected to the N inputs $322_1$ through $322_N$ of the first WGR 325 in an analogous manner as in the filter 200 in FIG. 2. The first WGR 325 and the first 1×N optical switch 315 may suitably be of the type discussed above and illustrated in FIG. 1.

As in FIG. 2, above, the first WGR 325 also comprises N outputs $330_1$ through $330_N$, including a set of N−1 retain outputs $330_1$ through $330_{N-1}$ and a drop output $330_N$. Each of the set of retain outputs $330_1$ through $330_{N-1}$ is connected to one of a set of N−1 inputs of the second WGR 335, such that the first output $330_1$ of the WGR 325 is connected to the first input $334_1$ of the second WGR 335, the second output $330_2$ of the first WGR 325 is connected to the second input $334_2$ of the second WGR 335, and so forth. The first WGR drop output $330_N$ is connected to a drop line fiber 332. The second WGR 335 also includes an add input $334_N$ that is connected to an add line fiber 333.

The second WGR 335 furthermore includes a set of N outputs $340_1$ through $340_N$, each of which is connected to one of a set of inputs $342_1$ through $342_N$ of the second 1×N optical switch 345. The second 1×N optical switch 345 is of the same structure as the first optical switch 315. The second optical switch 345 is connected to the filter output 350.

The filter 300 operates in a similar manner as the filter 200 in FIG. 2, and may also be utilized in a network to controllably drop and subsequently add a particular frequency component. The primary difference is the technique by which the filter 300 remultiplexes the frequency components of the WDM signal for output.

As before, when a WDM signal is provided at the filter input 310, the first optical switch 315 controllably provides the WDM signal to a select one of its N outputs, $320_x$, which then propagates to the WGR 325. The first WGR 325 receives the WDM signal at its Xth input $322_x$. The first WGR 325 provides at its outputs $330_1$ through $330_N$ the frequency components of the WDM signal, such that each frequency component appears at a distinct WGR output. The particular configuration of frequency components provided on the WGR outputs depends directly on the WGR input at which the WDM signal is received.

As before, the frequency component that appears at the drop output $320_N$ of the first WGR is the dropped frequency component. The remaining frequency components are provided to the inputs $334_1$ through $334_{N-1}$ of the second WGR 335. It is to be noted that when a WGR is used as a multiplexer, the particular output at which the WDM signal is provided depends upon the configuration of frequency components on the WGR inputs. Thus, the second WGR 335 multiplexes the remaining frequency components and provides the multiplexed result to a particular output $340_x$ which corresponds to the input $322_x$ of the first WGR 325. To do so, the second WGR 345 is substantially identical in structure or at least has substantially identical input/output characteristics as the first WGR 325.

The second optical switch 345 is also provided with a control signal that directs it to provide the WDM signal, which appears at its input $342_x$, to its output which is coupled to the filter output 350. The control of the optical switch 345, whether it be an electrooptic coupler or a mechanical optical switch, is known to those of ordinary skill in the art. If the optical switch 345 is of substantially identical structure as the first optical switch and the two WGRs 325 and 335 have substantially identical characteristics, the same control signal may be provided to the first and second optical switches 305 and 345.

In another alternative embodiment of the filter 200, a plurality of frequency channels may be dropped and/or added. In such an embodiment, the WGR 225 may suitably include a set of M drop outputs and a set of N-M retain outputs. The M outputs would then be connected to M drop fibers and the N-M retain outputs would be connected to the star coupler 235 or other multiplexing means. A set of M add fibers may also be connected to the star coupler 235.

A working example of the filter 200 discussed above in connection with FIG. 2 was constructed wherein the optical switch 215 was a DiCon VX500 low profile 1×N switch and the star coupler 235 was a Gould 23-40355-14 1×4 star coupler. The WGR 225 had a first set of three retain outputs $230_1$ through $230_3$ connected to three star coupler inputs $234_1$ through $234_3$, and one drop output $230_4$ connected to the drop line fiber 232. The experimental results of the filter are provided in FIGS. 4 through 6. The various components were connected by single mode optical fiber.

Figure 4:
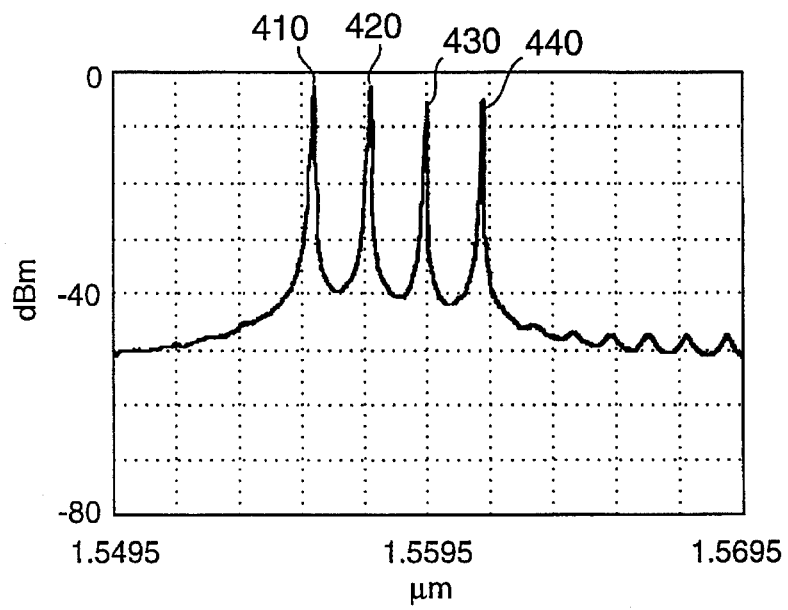
FIGS. 4, 5 and 6 illustrate the optical spectra of signals appearing at various sampling locations of an experimental prototype of the circuit illustrated in FIG. 2.

FIG. 4 shows the input optical WDM signal, comprising four frequency components 410, 420, 430 and 440, having four distinct evenly-spaced wavelengths. The optical switch 215 was configured to provide the WDM signal to its third output $220_3$. The WGR 225 thereafter provided the individual frequency components 410, 420, 430 and 440 to its outputs $230_3$, $230_4$, $230_1$ and $230_2$ respectively.

Figure 5:
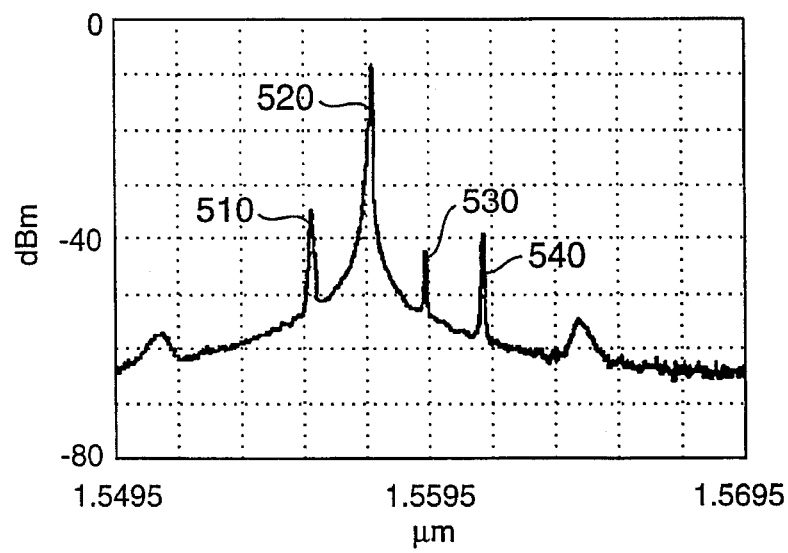

FIG. 5 shows the optical spectrum of the signal appearing on the drop line 232. Because the WDM signal was provided at the third input of the WGR 225, under ideal circumstances only the second frequency component would appear at the drop line 232. In fact, the spectrum shows that the second frequency component 520 was provided to the drop line 233 at a power level of over 25 dB greater than any of the other frequency components. The other frequency components 510, 530 and 540 are present at low power only. Their low power presence is due to cross talk and other limitations of the WGR.

Figure 6:
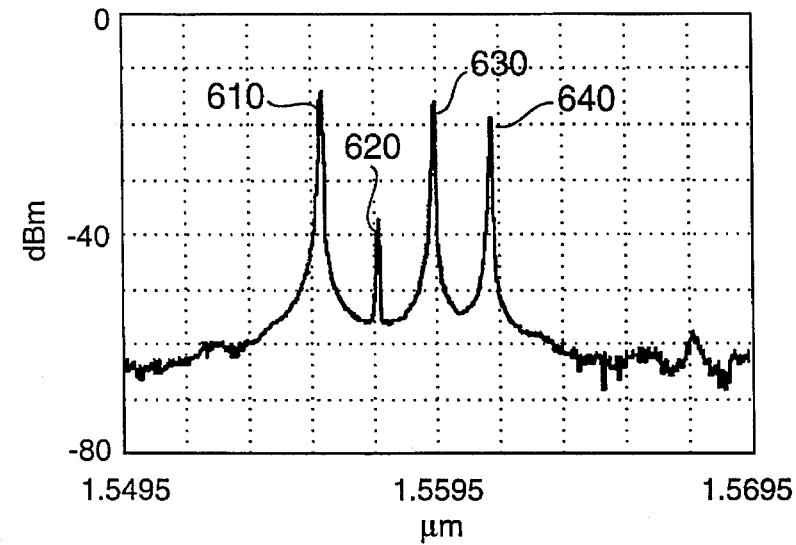

FIG. 6 shows the optical spectrum of the signal appearing at the filter output 240. The dropped frequency component 620 has substantially less optical power than the remaining components 610, 630 and 640. Again, limitations in the WGR 225 are responsible for the presence of the vestige signal 620 in the output. The experimental filter thus effectively dropped the second frequency component, and only the second frequency, component from the WDM input signal.

When the optical switch was controlled to provide the WDM signal to a different input of the WGR 225, a different frequency component was dropped from the output optical signal 240. Similar respective power levels were observed at the drop fiber 232 and the output 240.

The present invention thus provides a novel add/drop filter. The use of the WGR and an optical switch allows separate frequency components to be dropped from a single filter without requiring physical reconfiguration of the drop line with respect to the output ports. Furthermore, special acoustooptic devices and acoustic sources are not required as they are in the tunable add/drop filter taught by Cheung, above.

Figure 7:
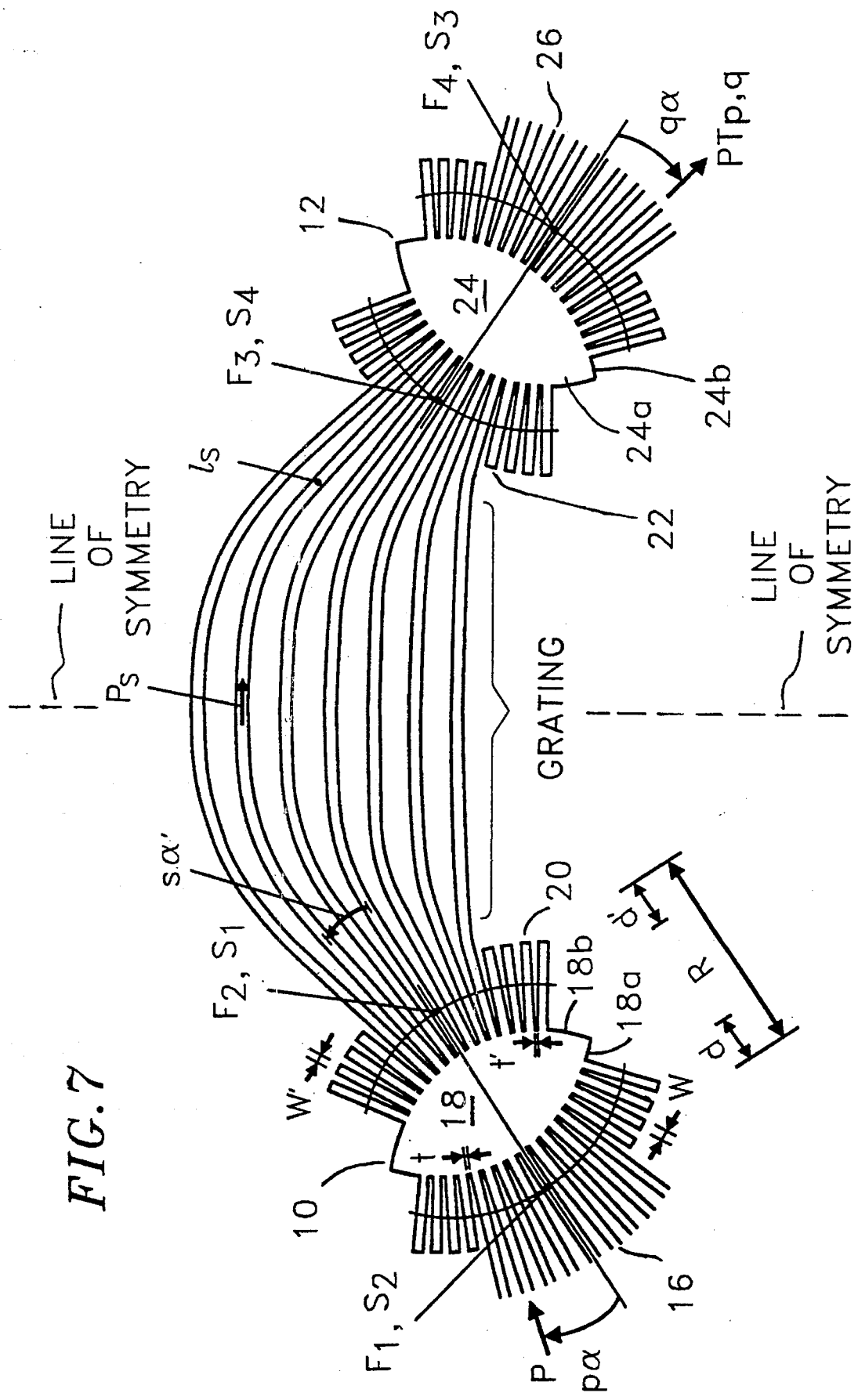
FIG. 7 illustrates a wavelength grating router which may be employed in the filters shown in FIGS. 2 and 3.

FIG. 7 illustrates an exemplary optical waveguide grating router which may be used in the tunable add/drop filters illustrated in FIGS. 2 and 3. This waveguide grating router is disclosed in U.S. Pat. No. 5,136,671, which is incorporated by reference herein. It preferably comprises two substantially identical and symmetrically disposed star couplers 10 and 12 connected by waveguides forming a substantially symmetrical optical diffraction grating 14.

FIG. 7 shows an array 16 of N input waveguides radially directed from N input ports toward a focal point F2. Each of the input waveguides has a predetermined width W and is angularly displaced from its adjacent waveguides by an angle a or α.

The star coupler 10 comprises a dielectric slab 18 which forms a free space region having two curved boundaries 18a and 18b. The input waveguides in the array 16 are connected to the free space region 18 in a substantially uniform fashion along boundary 18a. As indicated in FIG. 7, each of those waveguides is separated from adjacent waveguides by a distance t along the boundary 18a.

An array 20 of M output waveguides is radially directed toward a focal point F1. Each of the waveguides in the array 20 has a width W' and is separated from adjacent waveguides in the array 20 by an angular spacing a'. The output waveguides in the array 20 are connected to the free space region 18 in a substantially uniform fashion along boundary 18b. Each of the output waveguides is separated from its neighbors at the boundary 18b by a distance t', as shown in FIG. 7.

The M waveguides of the grating 14 are a symmetric arrangement of waveguides each having length $l_s$ where s is referenced to the central waveguide in the grating. Each half of the grating 14 comprises preferably three sections, respectively composed of radial, circular, and equispaced parallel waveguides.

Each of the output waveguides in the array 20 is connected to the input of a waveguide in the grating 14. The length of each waveguide in the grating differs from the lengths of all the other waveguides in the grating so that predetermined and different phase shifts are applied to optical signals propagating into the waveguides of the grating from the star coupler 10 because of the different path lengths over which the signals travel in the grating. The outputs of the waveguides in the grating 14 thus have different phases, which are functions of the lengths of the waveguides.

The outputs of the waveguides in the grating 14 are connected to another array 22 of M input waveguide which are radially directed toward a focal point F4. The array 22 connects the output of the grating 14 to the input of the second star coupler 12. Like star coupler 10, star coupler 12 comprises a slab of dielectric material 24 forming a free space region having two curved, preferably circular, boundaries $24_a$ and $24_b$. The array 22 of input waveguides is connected to the free space region in a substantially uniform distribution along boundary $24_a$.

An array of N output waveguides are radially directed from N output ports toward a focal point F3. The output waveguides in the array 26 are connected to the free space region 24 in substantially uniform distribution along the boundary $24_b$.

In general, when a WDM signal is provided at one of the router inputs in array 16, each of the frequency components of the WDM signal is provided at a distinct output of the output array 26. It is noted that the width of the channels, in other words, the subset of frequencies comprising a frequency component, may be controlled by proper design of the router. The details regarding the operation of the router shown in FIG. 7 are given in U.S. Pat. No. 5,136,671.

It is to be understood that the above-described embodiments of the invention are merely illustrative. Other implementations may readily be devised by those skilled in the art which will embody the principles of the invention and fall within the spirit and scope thereof.

I claim:

1. An optical filter for use with wavelength division multiplexed signals comprising a plurality of frequency components, the optical filter operable to remove at least one frequency component from a wavelength division multiplexed signal, the optical filter comprising:

a) a wavelength grating router, the router including a plurality of inputs and a plurality of outputs, the plurality of outputs further comprising a set of one or more drop outputs, the router operable such that when an input signal comprising a plurality of frequency components is received at one of the router inputs, each frequency component of the input signal is provided at a distinct output, and the distinct output at which each frequency component is provided is dependant upon the router input at which the input signal is received;

b) an optical switch comprising an input and a plurality of outputs connected to the wavelength grating router, each switch output connected to one of the plurality of router inputs, the switch operable to receive an optical signal at the switch input and provide the received optical signal at a select one of the plurality of switch outputs; and c) a multiplexer for wavelength division multiplexing a plurality of frequency components, the multiplexer coupled to less than all of the plurality of waveguide grating router outputs.

2. The optical filter of claim 1 wherein the plurality of wavelength grating router outputs further comprises a set of one or more retain outputs, each retain output coupled to the multiplexer.

3. The filter of claim 2 wherein the optical switch comprises an optoelectrical optical switch.

4. The filter of claim 2 wherein the optical switch comprises a mechanical optical switch.

5. The filter of claim 1 further comprising means for controllably selecting one of the plurality of switch outputs at which to provide an optical signal received at the optical switch input.

6. An optical filter for use with wavelength division multiplexed signals comprising a plurality of frequency components, the optical filter operable to remove at least one frequency component from a wavelength division multiplexed signal, the optical filter comprising:

a) a first wavelength grating router, the router including a plurality of inputs and a plurality of outputs, the plurality of outputs further comprising a set of one or more drop outputs and a set of one or more retain outputs, the router operable such that when an input signal including a plurality of frequency components is received at one of the router inputs, each frequency component of the input signal is provided to a distinct router output, and the distinct output at which each frequency component is provided is dependant upon the router input at which the input signal is received;

b) an optical switch comprising an input and a plurality of outputs connected to the first wavelength grating router, each switch output connected to one of the plurality of router inputs, the switch operable to receive an optical signal at the switch input and provide the received optical signal at a select one of the plurality of switch outputs;

c) a second waveguide grating router comprising a first set of inputs and a plurality of outputs, each of the first set of inputs coupled to one of the set of retain outputs of the first wavelength grating router; and d) a second optical switch comprising a plurality of inputs and an output, each of the plurality of optical switch inputs connected to one of the plurality of second wavelength grating router outputs, the switch operable to provide at its output an optical signal received at a select one of the plurality of switch inputs.

7. The optical filter of claim 6 wherein the second wavelength grating router comprises a second set of one of more inputs, the second set of inputs connected to one or more signal sources.

8. The optical filter of claim 6 wherein the wavelength grating router further comprises:
   a first free space region optically coupled to the plurality of inputs;
   a second free space region optically coupled to the plurality of outputs; and
   an optical grating providing optical communication between the first free space region and the second free space region.

9. The filter of claim 6 wherein the optical switch comprises a mechanical optical switch.

10. The filter of claim 6 wherein the optical switch comprises an optoelectrical optical switch.

11. An optical filter for use with wavelength division multiplexed signals comprising a plurality of frequency components, the optical filter operable to remove at least one frequency component from a wavelength division multiplexed signal, the optical filter comprising:
   a) a wavelength grating router, the router including a plurality of inputs and a plurality of outputs, the plurality of outputs further comprising a set of one or more drop outputs and a set of one or more retain outputs, the router operable such that when an input signal including a plurality of frequency components is received at one of the router inputs, each frequency component of the input signal is provided to a distinct router output, and the distinct output at which each frequency component is provided is dependant upon the router input at which the input signal is received;
   b) an optical switch comprising an input and a plurality of outputs connected to the wavelength grating router, each switch output connected to one of the plurality of router inputs, the switch operable to receive an optical signal at the switch input and provide the received optical signal at a select one of the plurality of switch outputs; and
   c) a star coupler comprising a first set of inputs and an output, each of the first set of inputs coupled to one of the set of retain outputs of the wavelength grating router.

12. The optical filter of claim 11 wherein the star coupler comprises a second set of one of more inputs, the second set of inputs connected to one or more signal sources.

13. The optical filter of claim 11 wherein the wavelength grating router further comprises:
   a first free space region optically coupled to the plurality of inputs;
   a second free space region optically coupled to the plurality of outputs; and
   an optical grating providing optical communication between the first free space region and the second free space region.

14. The filter of claim 11 wherein the optical switch comprises a mechanical optical switch.

15. The filter of claim 11 wherein the optical switch comprises an optoelectrical optical switch.

16. An optical filter for use with wavelength division multiplexed signals comprising a plurality of frequency components, the optical filter operable to remove at least one frequency component from a wavelength division multiplexed signal, the optical filter comprising:
   a) a wavelength router comprising
      a plurality of inputs for receiving a wavelength division multiplexed signal;
      a first free space region optically coupled to the plurality of inputs;
      a second free space region;
      an optical grating providing optical communication between the first free space region and the second free space region;
      a plurality of outputs to which the plurality of frequency components comprising the wavelength division multiplexed signal are provided, which outputs are further optically coupled to the second free space region, including at least one drop output and a set of retain outputs,
      wherein the output at which each frequency component of the plurality is provided is dependent upon the router input at which the multiplexed optical signal is received;
   b) an optical switch comprising;
      at least one input operable to receive multiplexed optical signals;
      a plurality of outputs operable to provide multiplexed optical signals, the plurality of outputs connected to the plurality of wavelength router inputs;
   c) a means for multiplexing a plurality of frequency components, the multiplexing means coupled to the set of retain outputs of the waveguide router; and
   d) a drop line connected to at least one drop output of the wavelength router.

17. A method of dropping a select frequency from a wavelength division multiplexed optical (WDM) signal, the WDM signal comprising a plurality of frequency components, the method comprising:
   a) controllably providing the WDM signal to a select input of a wavelength grating router (WGR) having a plurality of inputs and a plurality of outputs, the plurality of outputs including a drop output, the WGR operable to demultiplex the WDM signal provided at the select input and to route each of the frequency components of the demultiplexed WDM signal to one of the outputs, the output to which each of the frequency components are routed being dependent upon the select input of the WGR so that the select frequency component can be controllably routed to the drop output;
   b) propagating the select frequency component from the drop output to a drop line; and
   c) multiplexing a second plurality of frequency components, the second plurality of frequency components comprising the plurality of frequency components substantially without the select frequency component.

18. The method of claim 17 wherein the step a) further comprises:
   a) providing a WDM signal to a switch having a plurality of outputs; and
   b) controlling said switch to provide the WDM signal to a select output of the plurality of switch outputs.

19. The method of claim 17 further comprising the step of adding a new frequency component to the second plurality of frequency components.

20. A system for transmitting optical signals in the form of wavelength division multiplexed (WDM) signals, each WDM signal comprising a plurality of frequency components, the system comprising:
   a) a central switching office, the central switching office including a multiplexer and a demultiplexer;
   b) a tunable optical filter operable to remove at least one frequency component from a WDM signal, the optical filter comprising a wavelength grating router, the router including a plurality of inputs and a plurality of outputs including at least one drop output, the router operable such that when an input signal comprising a plurality of frequency components is received at one of the router inputs, each frequency component of the input signal is provided at a distinct output, and the distinct output at which each frequency component is provided is dependant upon the router input at which the input signal is received;

an optical switch comprising an input and a plurality of outputs connected to the wavelength grating router, each switch output connected to one of the plurality of router inputs, the switch operable to receive an optical signal at the switch input and provide the received optical signal at a select one of the plurality of switch outputs; and a multiplexer for wavelength division multiplexing a plurality of frequency components, the multiplexer coupled to less than all of the plurality of waveguide grating router outputs;

c) a length of optical fiber optically coupled to the central switching office multiplexer and the input of the optical switch of the tunable filter;

d) a length of optical fiber optically coupled to the central switching office demultiplexer and the multiplexer of the tunable optical filter; and e) a network node optically connected to at least one drop output of the wavelength grating router.

\* \* \* \* \*